United States Patent Office 3,182,061
Patented May 4, 1965

3,182,061
5-[4-(p-HYDROXYPHENOXY)PHENYL]-5-OXO-3-METHYLVALERIC ACID
Eric N. Goldschmidt, Hillside, N.J., assignor to Warner-Lambert Pharmaceutical Company, Morris Plains, N.J., a corporation of Delaware
No Drawing. Filed Mar. 20, 1961, Ser. No. 96,719
1 Claim. (Cl. 260—520)

The present invention relates to 5-substituted derivatives of 5-oxo-3-methylvaleric acid having the formula:

$$R_1-\bigcirc-\overset{O}{\overset{\|}{C}}-CH_2-\overset{CH_3}{\underset{|}{C}}-CH_2-COOH$$

wherein $R_1$ is hydroxy, halo, lower alkoxy,

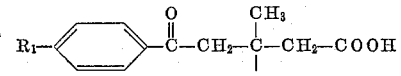

or

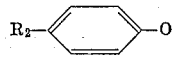

in which $R_2$ is lower alkoxy, hydroxy, nitro or amino and to a method of preparing these compounds.

The term "lower alkoxy" as used throughout the specification and in the claims refers to aliphatic groups containing 1 to 6 carbon atoms.

Exemplary of the compounds of this invention are 5-(p-methoxyphenyl)-5-oxo-3-methylvaleric acid,
5-(p-butoxyphenyl)-5-oxo-3-methylvaleric acid,
5-(p-hydroxyphenyl)-5-oxo-3-methylvaleric acid,
5-(p-chlorophenyl)-5-oxo-3-methylvaleric acid,
5-(p-bromophenyl)-5-oxo-3-methylvaleric acid,
5-(p-fluorophenyl)-5-oxo-3-methylvaleric acid,
5-(p-phenoxyphenyl)-5-oxo-3-methylvaleric acid,
5-[4-(p-methoxyphenoxy)phenyl]-5-oxo-3-methylvaleric acid,
5-[4-(p-nitrophenoxy)phenyl]-5-oxo-3-methylvaleric acid,
5-[4-(p-aminophenoxy)phenyl]-5-oxo-3-methylvaleric acid,
5-[4-(p-hydroxyphenoxy)phenyl]-5-oxo-3-methylvaleric acid,
5-[4-(p-methoxyphenyl)phenyl]-5-oxo-3-methylvaleric acid,
5-[4-(p-hydroxyphenyl)phenyl]-5-oxo-3-methylvaleric acid,
5-[4-(p-nitrophenyl)phenyl]-5-oxo-3-methylvaleric acid,
5-[4-(p-aminophenyl)phenyl]-5-oxo-3-methylvaleric acid and the like.

Those compounds of my invention having the formula:

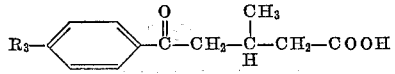

wherein $R_3$ is a halo, lower alkoxy,

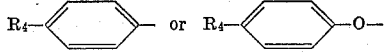

in which $R_4$ is lower alkoxy or nitro may be prepared by the following reaction:

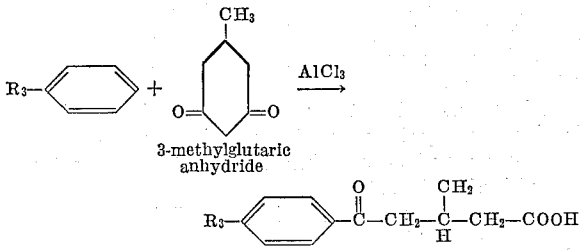

The reaction is carried out in the presesnce of a molar excess of aluminum chloride in an anyhdrous inert solvent reaction medium, nitromethane and methylene dichloride being particularly useful inert solvents. The reactants are agitated vigorously in the solvent and in the presence of aluminum chloride at a temperature of 5° C. or below for about 30 minutes to about 2 hours and the reaction is then brought to completion by refluxing for about 20 to about 60 minutes or by maintaining the mixture at room temperature for periods up to about 3 days.

At the conclusion of the reaction, the mixture is treated with acid, extracted with ether and the product recovered from the extract by conventional techniques of crystallization, distillation or isolation in the form of crystallizable salts.

It has also been found that those compounds of the above formula where $R_2$ is lower alkoxy, p-(lower alkoxy)phenyl or p-(lower alkoxy)phenoxy may be converted to 5 - (p-hydroxyphenyl)-5-oxo-3-methylvaleric acid, 5 - [4-(p-hydroxyphenyl)phenyl]-5-oxo-3-methylvaleric acid and 5-[4-(p-hydroxyphenoxy)phenyl]-5-oxo-3-methylvaleric acid, respectively, by conventional dealkylation procedures. Treatment with aluminum chloride in methylene chloride under reflux, or 30 percent hydrobromic acid and glacial acetic acid, or potassium hydroxide in ethylene glycol under reflux are all effective dealkylation procedures.

In addition, I have found that 5-[4-(p-nitrophenoxy)phenyl]-5-oxo-3-methylvaleric acid and 5-[4-(p-nitrophenyl)phenyl]-5-oxo-3-methylvaleric acid which may be prepared as described hereinabove by the reaction of 4-(p-nitrophenoxy)benzene and 4-(p-nitrophenyl)benzene, respectively, with 3-methylglutaric anhydride, may be reduced by procedures conventionally employed to reduce an aromatic nitro group to an amino group, for example by treatment in alcohol with Raney nickel or palladium on barium sulfate to form 5-[4-(p-aminophenoxy)phenyl]-5-oxo-3-methylvaleric acid and 5 - [4 - (p-aminophenyl)phenyl]-5-oxo-3-methylvaleric acid, respectively.

The compounds of this invention are useful as chemical intermediates. The treatment of the compounds of this invention of the formula:

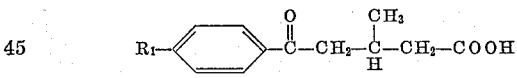

with a reducing medium comprising a suspension of zinc amalgam in acetic acid and concentrated hydrochloric acid, under reflux, results in the production of compounds of the formula:

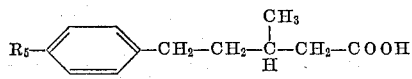

wherein $R_5$ is hydroxy, halo, lower alkoxy,

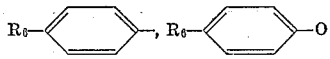

in which $R_6$ is lower alkoxy, hydroxy or amino, as described in my application entitled "Derivatives of 3-Methylvaleric Acid and Process Therefor," now U.S. Patent No. 3,120,551. In addition, the compounds of this invention have been found to have interesting pharmacological activity in reducing blood cholesterol levels by virtue of their unique property of inhibiting the biosynthesis of cholesterol. Studies of cholesterol biosynthesis have revealed that cholesterol is synthesized within various body tissues, primarily the liver, in a multi-step synthesis initiated by the acetylation of Coenzyme A with acetyl fragments present in each tissue. The compounds of this invention are unusually effective in blocking the conversion of acetyl Coenzyme A to cholesterol and its immediate precursors in this biosynthetic route. These compounds are thus valuable agents for use in the control of hypercholesteremia. In use, these compounds may be formulated with conventional pharmaceutical carriers to form dosage unit forms such as tablets, capsules, suppositories, solutions, suspensions and the like.

The following examples are included in order further to illustrate the present invention:

Example 1

To a suspension of 65.25 g. (0.49 mol) aluminum chloride in 600 cc. dry methylene chloride at room temperature is added, successively, a solution of 25 g. (0.195 mol) 3-methylglutaric anhydride in 50 ml. dry methylene chloride and 22.5 g. (0.2 mol) chlorobenzene in 50 ml. dry methylene chloride. This solution is stirred at room temperature for 16 hours. The reaction is halted by the slow addition of 120 ml. water, followed by 40 ml. concentrated hydrochloric acid, the temperature being held below 30° C. at all times. The solvent is then removed by steam distillation and the aqueous residue extracted with several portions of ether. The combined ether extracts are washed with water, dried over magnesium sulfate and the solvent removed. The residue is distilled and the fraction boiling at 148–190° C./0.05 mm. of mercury is recrystallized from a mixture of 2% ethyl acetate in cyclohexane to give 5-(p-chlorophenyl)-5-oxo-3-methylvaleric acid, melting point=89.5–90.5° C.

*Analysis:*—Calc.: C, 59.88; H, 5.44; Cl, 14.73. Found: C, 59.78; H, 5.52; Cl, 14.86

Example 2

Anisole and 3-methylglutaric anhydride are reacted with aluminum chloride in methylene dichloride as described in Example 1 The reaction conditions are two hours at 0° C. followed by two hours at room temperature. The reaction is halted by the addition of 25 percent aqueous hydrochloric acid and the product isolated and crystallized as described in Example 1. Yield: 70 percent of theory of 5-(p-methoxyphenyl)5-oxo-3-methylvaleric acid, melting point 97–98° C.

*Analysis:*—Calc.: C, 66.08; H, 6.83. Found: C, 66.05; H, 6.72.

Example 3

A suspension of 2.36 g. (10 millimols) 5-(p-methoxyphenyl)-3-methyl-5-oxovaleric acid prepared as described in Example 3 and 6.65 g. (50 millimols) aluminum chloride in 50 ml. dry benzene is allowed to reflux for 4 hours. The reaction mixture is cooled and the reaction halted by the addition of cold dilute 1 N hydrochloric acid. The aqueous phase is extracted with ether, the combined organic phase dried and the solvent removed. The residue is recrystallized from hot water to yield 5-(p-hydroxyphenyl)-5-oxo-3-methylvaleric acid in 80 percent yield, melting point=157–158° C.

*Analysis.*—Calc.: C, 64.85; H, 6.35. Found: C, 64.82; H, 6.42.

Example 4

A mixture of anisole, 3-methylglutaric anhydride, aluminum chloride and methylene dichloride is reacted for two hours at 0° C and two hours at room temperature as described in Example 3. Additional aluminum chloride is then added (2 mols per mole of anisole) and the mixture is refluxed for four hours. The mixture is then processed as described in Example 4 to yield 5-(p-hydroxyphenyl)-5-oxo-3-methylvaleric acid. The foregoing example illustrates the preparation of this compound from anisole without isolation of the intermediate 5-(p-methoxyphenyl)-5-oxo-3-methylvaleric acid.

Example 5

A mixture of p-nitrophenoxybenzene, 3-methylglutaric anhydride and aluminum chloride are reacted as described in Example 1 using nitromethane as the solvent. The reaction conditions are 90 minutes at 0° C. followed by three days at room temperature. The reaction mixture is then processed in the manner described in Example 1 to yield crude 5-[4-(p-nitrophenoxy)phenyl]-5-oxo-3-methylvaleric acid.

This crude product is purified by adding an ethereal solution thereof to a freshly prepared ethereal solution of 2-benzyl-2-thiopseudourea. The precipitate which forms is crystallized from acetone to yield the 2-benzyl-2-thiopseudo-uronium salt of 5-[4-(p-nitrophenoxy)phenyl]-5-oxo-3-methylvaleric acid at 60 percent yield.

This salt is partitioned between ether and a phosphate buffer at a pH of 2–3. The ether is removed from the organic phase and the residue is recrystallized from carbon tetrachloride containing a small amount of ether to yield 5-[4-(p-nitrophenoxy)phenyl]-5-oxo-3-methylvaleric acid, melting point=81.5–82.5° C.

*Analysis.*—Calc.: C, 62.97; H, 4.99; N, 4.08. Found: C, 62.89; H, 5.18; N, 410.

Example 6

A solution of 5-[4-(p-nitrophenoxy)phenyl]-5-oxo-3-methylvaleric acid in 95 percent aqueous ethanol is reduced at atmospheric temperature and room temperature with hydrogen over a 5 percent palladium-on-barium sulphate catalyst. When the theoretical amount of hydrogen has been taken up, the addition of hydrogen is stopped, the catalyst removed by fitlration and the solvent is evaporated. The residue is dissolved in methylene chloride and the resulting solution is treated with anhydrous HCl to give at a 67.5 percent yield the hydrochloride salt of 5-[4-(p-aminophenoxy)phenyl]-5-oxo-3-methylvaleric acid, melting point=157–159° C.

*Analysis.*—Calc.: C, 61.80; H, 5.76; N, 4.00; Cl, 10.14. Found: C, 62.13; H, 6.04; N, 3.86; Cl, 10.13.

The same product is obtained by the reduction of 5-[4-(p-nitrophenoxy)phenyl]-5-oxo-3-methylvaleric acid at room temperature and three atmospheres hydrogen pressure over a Raney nickel catalyst. The hydrochloride salt is purified by recrystallization from methanol containing a small amount of ether.

Example 7 p-Methoxyphenoxybenzene and 3-methylglutaric anhydride are reacted with aluminum chloride in methylene dichloride as described in Example 1. The crude product, isolated as described in Example 1, is distilled. The fraction coming over at 190–240° C. at 0.1 mm. of mercury is recrystallized from 50–50 cyclohexanebenzene to give at a 30 percent yield 5-[4-p-methoxyphenoxy)-phenyl]-5-oxo-3-methylvaleric acid, melting point=88–89° C.

*Analysis.*—Calc.: C, 69.50; H, 6.14. Found: C, 69.62; H, 6.25.

Example 8

A solution of 40 millimols 5-[4-(p-methoxyphenoxy)-phenyl]-5-oxo-3-methylvaleric acid in 80 ml. glacial acetic acid and 80 ml. 48 percent aqueous hydrobromic acid is refluxed for 2 hours. The cooled mixture is poured into 160 ml. water. The solids are recovered and recrystallized from benzene to give at a 70 percent yield 5 - [4 - (p - hydroxyphenoxy)phenyl] - 5 - oxo - 3-methylvaleric acid, melting point=118–124° C.

*Analysis.*—Calc.: C, 68.78; H, 5.77. Found: C, 68.63; H, 5.90.

It is understood that the foregoing detailed decription is given merely by way of illustration and that many variations may be made therein without departing from the spirit of my invention.

Having described my invention, what I desire to secure by Letters Patent is:

5 - [4 - (p - hydroxyphenoxy)phenyl] - 5 - oxo - 3-methylvaleric acid.

References Cited by the Examiner
UNITED STATES PATENTS

| | | | |
|---|---|---|---|
| 2,071,496 | 2/37 | Bruson et al. | 260—515 |
| 2,792,418 | 5/57 | Druey et al. | 260—520 |
| 3,038,934 | 6/62 | Kerwin | 260—520 X |

OTHER REFERENCES

Fieser et. al.: "J. Am. Chem. Soc.," vol. 70 (1948), pages 3200–3201.

Huang-Minton: "J. Am. Chem. Soc.," vol. 68, pp. 2487–2488 (1946).

LORRAINE A. WEINBERGER, *Acting Primary Examiner.*

LEON ZITVER, CHARLES B. PARKER, *Examiners.*